United States Patent [19]

Horlbeck et al.

[11] 4,208,527
[45] Jun. 17, 1980

[54] PROCESS FOR THE MANUFACTURE OF HIGH MOLECULAR WEIGHT POLY-(ETHYLENE TEREPHTHALATE)

[75] Inventors: Gernot Horlbeck, Dorsten; Klaus Burzin; Roland Feinauer, both of Marl, all of Fed. Rep. of Germany

[73] Assignee: Chemische Werke Huels, Aktiengesellschaft, Marl, Fed. Rep. of Germany

[21] Appl. No.: 19,673

[22] Filed: Mar. 12, 1979

[30] Foreign Application Priority Data

Mar. 18, 1978 [DE] Fed. Rep. of Germany ....... 2811982

[51] Int. Cl.$^2$ ................................................ C08 G 63/14
[52] U.S. Cl. .................................... 528/279; 528/283; 528/286; 528/309
[58] Field of Search ................. 528/279, 283, 286, 309

[56] References Cited

U.S. PATENT DOCUMENTS

| | | | |
|---|---|---|---|
| 3,962,189 | 8/1976 | Russin et al. | 528/277 |
| 4,010,145 | 3/1977 | Russin et al. | 528/280 |
| 4,119,614 | 10/1978 | King et al. | 528/283 |
| 4,128,533 | 12/1978 | Köhler et al. | 528/279 |
| 4,128,534 | 12/1978 | Köhler et al. | 528/279 |
| 4,133,800 | 1/1979 | Taubinger et al. | 528/283 X |

FOREIGN PATENT DOCUMENTS 1351194 4/1974 United Kingdom ..................... 528/285

*Primary Examiner*—Lucille M. Phynes
*Attorney, Agent, or Firm*—Millen & White

[57] ABSTRACT

In a process for preparing high molecular weight poly-(ethylene terephthalate) in two stages, comprising, in the first stage, reacting a dialkyl ester of terephthalic acid with ethylene glycol in the presence of 35 to 290 ppm of manganese, in the form of a manganese-II salt effective as a catalyst, together with 6 to 95 ppm of cobalt, in the form of a cobalt-II salt effective as a catalyst, at a temperature of 170° to 220° C. to give a low molecular weight precondensate; then adding 45 to 140 ppm of phosphorus in the form of a phosphorus compound effective to minimize discoloration of the product poly-(ethylene terephthalate) due to said transesterification catalysts; and, in the second stage, effecting complete condensation of the precondensate thus obtained, in the presence of catalysts at a temperature of 270°–290° C. and under low pressure, to give high molecular weight poly-(ethylene terephthalate), an improvement is provided wherein, in the second stage, 115 to 230 ppm of germanium, in the form of a germanium-IV salt effective as a catalyst, and 2 to <20 ppm of titanium, in the form of a titanium-IV salt effective as a catalyst, all quantity data for the catalyst components being based on the weight parts of terephthalic acid units, are added to the reaction mixture as the catalysts.

11 Claims, No Drawings

PROCESS FOR THE MANUFACTURE OF HIGH MOLECULAR WEIGHT POLY-(ETHYLENE TEREPHTHALATE)

BACKGROUND OF THE INVENTION

The present invention relates to a process for the manufacture of high molecular weight poly-(ethylene terephthalate) in two stages.

It is known to manufacture high molecular weight poly-(ethylene terephthalate) by reacting dialkyl esters of terephthalic acid with diols. The industrial manufacture is generally carried out in two stages.

In the first stage, the dialkyl ester of terephthalic acid is first converted, using trans-esterification catalysts, to the bis-(2-hydroxyalkyl) terephthalate or to low molecular weight precondensates thereof. This is done by reacting a dialkyl ester of terephthalic acid with ethylene glycol in the presence of 35 to 290 ppm of manganese, in the form of a manganese-II salt, together with 6 to 95 ppm of cobalt, in the form of a cobalt-II salt, as the catalyst, at temperatures in the range of 170°–220° C. to give a low molecular weight precondensate and then adding 45 to 140 ppm of phosphorus in the form of a compound.

The precondensate thus formed is then subjected, in the second stage, to a condensation reaction in the presence of polycondensation catalysts, to give high molecular weight poly-(ethylene terephthalate), high temperatures and low pressure being employed for this stage. That is, the complete condensation of the precondensate is effected in the presence of catalysts at temperatures in the range of 270°–290° C. and under low pressure, to give high molecular weight poly-(ethylene terephthalate).

In order to obtain a reaction time which is practicable industrially, both the trans-esterification reaction and the polycondensation reaction must be accelerated by catalysts. However, the commonly used catalysts promote not only the reaction by which the polyester is built up but also degradation reactions during trans-esterification and polycondensation. As a result, they effectively determine essential characteristics of the polyester, such as color, melting point and stability to heat. Little is known about the influence of the type and amount of the catalysts on the stability of the polyesters to hydrolysis.

Usually, different catalysts are employed for each of the two reaction stages. Typical catalysts include, for example, salts of the metals lead, cadmium, calcium, magnesium, zinc, cobalt and manganese.

Zinc salt catalysts have the disadvantage that they strongly catalyze degradation reactions of the polyester during the trans-esterification and polycondensation and thus impair the characteristics of the end product (Faserforschung und Textiltechnik 24, 445 (1973)).

Manganese, lead, cadmium and cobalt compounds discolor the finished poly-(ethylene terephthalate) (Faserforschung und Textiltechnik 13, 481 (1962)). On the other hand, calcium and magnesium compounds, although they give colorless products, have a lower catalytic reaction (Polymer 16, 185 (1975)). These adverse effects of the trans-esterification catalysts can be avoided to some extent during the polycondensation in a known manner by the prior addition of phosphorus compounds (Faserforschung und Textiltechnik 19, 372 (1968); and British Patent Specifications Nos. 588,833 and 769,220).

The polycondensation catalysts conventionally employed are antimony, titanium or germanium compounds.

Antimony compounds have the disadvantage that a partial reduction to metallic antimony takes place in the course of the polycondensation, so that the condensation products have a grayish tinge (H. Ludewig, Polyesterfasern (Polyester Fibres), Akademie-Verlag, Berlin 1975; and German Offenlegungschrift 2,126,218).

The use of titanium compounds in the conventional concentrations results in yellow-colored products in the case of poly-(ethylene terephthalate) (J. Polymer Sci. (A), 4, 1851 (1966)).

Germanium compounds as polycondensation catalysts, do indeed produce colorless polycondensation products. However, unfortunately they accelerate the polycondensation reaction to a lesser extent than, for example, antimony compounds. Longer reaction times are therefore required, and as a result of this, the characteristics of, for example, the resultant poly-(ethylene terephthalates) are impaired (Faserforschung and Textiltechnik 13, 481 (1962) and German Offenlegungsschrift 2,107,247).

In addition to the use of these catalysts, as single components, combinations of different catalysts have also already been used, especially in order to improve the color of the polyester (German Offenlegungsschriften 2,126,218 and 2,548,630).

However, the use of, for example, poly-(ethylene terephthalate) for the manufacture of monofilaments for filter fabrics has shown, in experiments carried out in-house, that the products produced with the known catalysts or catalyst combinations are very severely degraded when they come into contact with a hot aqueous filtrate, as a result of which the filter fabric loses strength and becomes mechanically unusable.

German Offenlegungsschrift 2,707,832 discloses a catalyst mixture of manganese, cobalt, phosphorus, titanium and antimony compounds. With the exception of the phosphorus compound, all the catalyst components are added to the reaction mixture at the start of the first stage (trans-esterification). The poly-(ethylene terephthalates) obtained by this process are strongly colored and possess low stability to hydrolysis and heat.

A catalyst combination of manganese and cobalt compounds is known for the first stage (trans-esterification) from British Patent Specification No. 1,135,233.

German Offenlegungsschrift 2,020,330 describes the addition of carbodiimides to polyesters which have already completely condensed, before these polyesters are further processed. It is said that, inter alia, improved stability to hydrolysis is achieved by this means. However, it has been found that these polyesters are also discolored.

SUMMARY OF THE INVENTION

Accordingly, it is an object of the present invention to provide a process for manufacturing poly-(ethylene terephthalate) which is stable to hydrolysis in the presence of hot water, and yet which does not suffer from an attendant deterioration in its general characteristics, e.g., those properties hitherto known to be impaired.

Upon further study of the specification and appended claims, further objects and advantages of this invention will become apparent to those skilled in the art.

These objects have been achieved by providing in a process for preparing high molecular weight poly-(ethylene terephthalate) in two stages, comprising in the first stage, reacting a dialkyl ester of terephthalic acid with ethylene glycol in the presence of 35 to 290 ppm of manganese, in the form of a manganese-II salt effective as a catalyst, together with 6 to 95 ppm of cobalt, in the form of a cobalt-II salt effective as a catalyst, at a temperature of 170° to 220° C. to give a low molecular weight precondensate; then adding 45 to 140 ppm of phosphorus in the form of a phosphorus compound effective to minimize discoloration of the product poly-(ethylene terephthalate) due to said trans-esterification catalysts; and, in the second stage, effecting complete condensation of the precondensate, thus obtained, in the presence of catalysts at a temperature of 270°-290° C. and under low pressure, to give high molecular weight poly-(ethylene terephthalate),
the improvement wherein, in the second stage, 115 to 230 ppm of germanium, in the form of a germanium-IV salt effective as a catalyst, and 2 to <20 ppm of titanium, in the form of a titanium-IV slat effective as a catalyst, all quantity data for the catalyst components being based on the weight parts of terephthalic acid units, are added to the reaction mixture as the catalysts. After adding the Ge(IV) and Ti(IV) catalyst components, first the temperature of the reaction mixture is raised to 270°-290° C. and then the reaction pressure is lowered continuously to a value below 0.5 mbar, in order to carry out the second stage.

DETAILED DISCUSSION

By high molecular weight poly-(ethylene terephthalate) is meant such polymers having a number average molecular weight of 20,000 or higher, as measured by determination of endgroups.

Suitable dialkyl esters of terephthalic acid for use in this invention include those with alkanols of 1-4 carbon atoms, preferably those wherein the alkyl groups are the same, especially dimethyl terephthalate.

Up to 20% of the terephthalic acid units can be replaced by other equivalent conventional dicarboxylic acids as is well known. Suitable such equivalent acids useful as such modifying components include, for example, aliphatic dicarboxylic acids having up to 20 carbon atoms, or cycloaliphatic or aromatic dicarboxylic acids. Examples of such suitable equivalent dicarboxylic acids include succinic acid, adipic acid, sebacic acid, dodecanedioic acid, cyclohexane-dicarboxylic acid, isophthalic acid, diphenyldicarboxylic acid and 2,6- or 2,7-naphthalenedicarboxylic acid.

The alkyl ester is trans:esterified with ethylene glycol. Up to 20% of the diol can be replaced by other equivalent aliphatic or cycloaliphatic diols having 3-12 carbon atoms, such as, for example, butane-1,4-diol, hexane-1,6-diol, dodecane-1,12-diol, neopentylglycol, 1,4-bis-hydroxymethylcyclohexane, and the like.

The ratio of dialkyl ester to ethylene glycol is in general 1:1.5-3 and preferably 1:1.8-2.2. The reaction is preferably carried out in the temperature range of 180° to 195° C. The trans-esterification has ended when the theoretical amount of alcohol has been distilled off.

According to the invention, manganese-II salts and cobalt-II salts are employed as catalysts in the trans-esterification stage. The salts used as catalysts can be added to the reaction mixture individually or as a mixture.

Suitable manganese-II salts include salts of carboxylic acids or hydroxycarboxylic acids of 1-6 carbon atoms, such as, for example, Mn-II acetate, Mn-II propionate, Mn-II succinate or Mn-II lactate. Furthermore, manganese-II borate, manganese-II oxide, manganese-II hydroxide, manganese-II carbonate or manganese-II ethyleneglycolate can also be used. The amount of manganese-II salt which is added to the reaction mixture is such that the mixture contains—based on the weight parts of terephthalic acid units—35 to 290 and preferably 50 to 100 ppm of manganese. Manganese-II acetate tetrahydrate is preferably employed.

Cobalt-II salts are used as an additional catalyst component. Suitable salts which can be used for this purpose include the salts of carboxylic acids or hydroxycarboxylic acids having 1-6 carbon atoms in the carbon skeleton, such as, for example, cobalt-II acetate, cobalt-II propionate, cobalt-II succinate or cobalt-II lactate. Furthermore, cobalt-II nitrate, cobalt-II chloride, cobalt-II oxide or cobalt-II ethyleneglycolate can also be employed. The amount of cobalt-II salt which is added to the reaction mixture is such that the mixture contains—based on the weight parts of terephthalic acid units—6 to 95 and preferably 9 to 30 ppm of cobalt. Cobalt-II acetate tetrahydrate in ethylene glycol solution is a preferred catalyst component. Preferably, the transesterification stage is carried out in an inert atmosphere, e.g. nitrogen.

After the trans-esterification stage has ended, 45 to 140 and preferably 70 to 110 ppm of phosphorus, in the form of a compound, are added—based on the weight parts of terephthalic acid units. Suitable phosphorus compounds include, for example, phosphorus acid or phosphoric acid. However, alkyl- or aryl-substituted phosphites and phosphates having 1-12 C atoms in the carbon skeleton, such as, for example, trimethyl phosphite or phosphate, tri-n-butyl phosphite or phosphate, tridodecyl phosphite or phosphate and substituted triphenyl phosphites or phosphates, can also be used. The addition of triphenyl phosphite or phosphate is preferred.

Furthermore, germanium-IV salts and titanium-IV salts are added to the reaction mixture at this point.

The germanium-IV salts are used in an amount such that the reaction mixture contains 115 to 230 and preferably 120 to 160 ppm of germanium—based on the weight parts of terephthalic acid units. Suitable germanium-IV salts which can be used include, inter alia, germanium-IV oxide, germanium-IV ethylene-glycolate or alkali metal germanates. Germanium-IV oxide in ethylene glycol solution is particularly preferred.

Titanium-IV salts are used as an additional catalyst component for the polycondensation stage. These salts are added to the reaction mixture in an amount such that the mixture contains 2 to <20 and preferably 5-15 ppm of titanium—based on the weight parts of terephthalic acid units. The titanium-IV salts can be employed in the form of titanium-IV $C_1$-$C_4$ alkoxides, such as, for example, titanium tetramethylate, titanium tetrabutylate, titanium tetra-isopropylate or titanium tetrapropylate, alkali metal titanates or alkali metal hexafluorotitanates. The use of titanium tetra-isopropylate in isopropanol as the solvent is preferred.

The catalyst components are employed in the molar ratios given below:
Mn:Co=3-6:1, preferably 4-5:1
Mn/Co:P=0.5-1:1, preferably 0.6-0.85:1
Ge:Ti=10-20:1, preferably 15-20:1

Ge/Ti:Mn/Co=1–3:1, preferably 1.5–2.5:1

After the trans-esterification has ended, the phosphorus compound is preferably added first and then a mixture of the catalytic metal compounds is added to the reaction mixture. However, it is also possible to add all three components all at once. After this addition, the mixture is heated to temperatures in the range of 270° to 290° and preferably 275° to 285° C. over a period of 1 to 3 hours. When the desired temperature has been reached, the pressure in the reaction kettle is lowered continuously to <0.5 mbar, e.g. 0.1–0.4 mbar, over a period of 1 to 2 hours.

The process can, for example, be carried out as follows: a mixture of manganese-II and cobalt-II salts is added to a mixture of dimethyl terephthalate and ethylene glycol, which are in a molar ratio of about 1:1.5 to 1:2.5, optionally, also containing modifying dicarboxylic acid or glycol components. The trans-esterification reaction is then carried out at 180° to 200° C. for 2 to 4 hours under a nitrogen atmosphere. Then, the phosphorus compound is first added and stirred in, and subsequently the germanium-IV and titanium-IV salts are added. The temperature of the reaction mixture is raised to 270° to 280° C. After the desired temperature has been reached, the pressure is lowered to less than 0.5 mbar and the reaction mixture is subjected to polycondensation in the course of 2 to 4 hours until the desired degree of polycondensation is reached, which is established by determining the reduced specific viscosity (RSV).

The process according to this invention produces colorless polyesters which have good general properties and, in particular, excellent stability to hydrolysis.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Examples 1–7 and Comparative Examples A–E

Examples 1 to 7 and Comparison Examples A to E in Table 1 were carried out in accordance with the instructions which follow, using the amounts of catalyst and of phosphorus compounds indicated in Table 1.

12.8 kg of dimethyl terephthalate, 8.1 kg of ethylene glycol and the amounts of trans-esterification catalysts indicated in Table 1 are reacted under nitrogen for 3 hours at 195° C., the methanol liberated being separated off. The amount of triphenyl phosphate indicated in Table 1 is then added and stirred in for 30 minutes and the polycondensation catalysts are then added, in the amounts indicated in Table 1, and also stirred in for 30 minutes. The temperature of the reaction mixture is then raised to 280° C. in the course of 6 hours, after which the pressure is lowered to 0.3 mbar in the course of 2 hours. Under these reaction conditions, the batch is subjected to polycondensation in the course of 2 hours. After the vacuum has been removed by adding nitrogen, the polyester melt is discharged, cooled in water and granulated. In order to increase the molecular weight, the granules are subjected to a post-condensation in the solid phase, in a known manner (24 hours/230° C./0.1 mbar).

RSV values and hydrolysis tests were performed as described for Examples 8–11.

Table 1

| Example | Trans-esterification catalyst | Polycondensation catalyst | | RSV (dl/g) before hydrolysis test | RSV (dl/g) after hydrolysis test | Color of the melt |
|---|---|---|---|---|---|---|
| 1 | 3.32 g Mn(ac)$_2$* 0.83 g Co(ac)$_2$* | 10.76 g TPP* | 2.75 g GeO$_2$ 0.5 g TTI* | 0.62 | 0.59 | colorless |
| 2 | 3.32 g Mn(ac)$_2$* 0.83 g Co(ac)$_2$* | " | 2.75 g GeO$_2$ 0.5 g TTI* | 1.30 | 1.30 | " |
| 3 | 3.32 g Mn(ac)$_2$* 0.83 g Co(ac)$_2$* | " | 2.10 g GeO$_2$ 0.5 g TTI | 1.04 | 1.00 | " |
| 4 | 3.32 g Mn(ac)$_2$* 0.83 g Co(ac)$_2$* | " | 2.10 g GeO$_2$ 1.1 g TTI | 1.01 | 0.99 | " |
| 5 | 3.43 g Mn(ac)$_2$ 0.65 g Co(ac)$_2$ | 8.61 g TPP | 2.10 g GeO$_2$ 1.1 g TTI | 1.19 | 1.16 | " |
| 6 | 3.43 g Mn(ac)$_2$ 0.65 g Co(ac)$_2$ | " | 2.85 g GeO$_2$ 1.1 g TTI | 1.07 | 1.03 | " |
| 7 | 2.92 g Mn(ac)$_2$ 0.80 g Co(ac)$_2$ | 9.47 g TPP | 2.15 g GeO$_2$ 1.0 g TTI | 1.10 | 1.07 | " |
| A | 3.43 g Mn(ac)$_2$ | 4.72 g TPP | 1.57 g GeO$_2$ | 1.20 | 1.06 | pale yellowish |
| B | 3.43 g Mn(ac)$_2$ | 6.90 g TPP | 1.57 g GeO$_2$ | 1.34 | 1.20 | " |
| C | 4.29 g Mn(ac)$_2$ | 10.76 g TPP | 2.10 g GeO$_2$ | 0.84 | 0.78 | slightly yellowish |
| D | 4.08 g Mn(ac)$_2$ | 11.1 g TPP | 4.74 g Sb$_2$O$_3$ | 1.07 | 0.84 | slightly gray |
| E | 3.17 g Zn(ac)$_2$* 0.80 g Co(ac)$_2$ | — | — | 1.20 | 0.89 | colorless |

*Mn(ac)$_2$: manganese-II acetate
TPP: triphenyl phosphate
Co(ac)$_2$: cobalt-II acetate
TTI: titanium-IV tetra-isopropylate
Zn(ac)$_2$: zinc acetate

Examples 8–11 and Comparison Examples F–Y

Examples 8 to 11 and Comparison Examples F to Y in Table 2 were carried out in accordance with the instructions which follow, using the amounts of catalyst and phosphorus compounds indicated in Table 2.

58.3 g of dimethyl terephthalate, 37.2 g of ethylene glycol and the amounts of trans-esterification catalysts indicated in Table 2 are reacted under nitrogen for 3 hours at 190° C., the methanol liberated being distilled off from the reaction mixture. After adding the amount of phosphorus compound and polycondensation catalysts indicated in Table 2, the temperature of the mixture is raised to 280° C. in the course of 1 hour, after which the pressure is reduced to less than 0.4 mbar in the course of 30 to 40 minutes. Under these conditions, the batch is subjected to polycondensation for 80 to 100 minutes. In order to increase the molecular weight, the product is subjected to post-condensation in the solid phase (24 hours/230° C./0.1 mbar), as indicated by the preceding Example.

The RSV value is determined for a solution of 0.23 g of polyester in 100 ml of phenol/tetrachloroethane (weight ratio 60:40) at 25° C.

The stability to hydrolysis is ascertained by determining the RSV value of a sample of the polyester before and after treating with water at 130° C. in a pressure cooker for 5 hours.

The experiments characterized by letters are not according to the invention.

Table 3

| | Catalyst system (ppm)* | | RSV (dl/g) before after hydrolysis test | | Yellow/blue value according to Gardner* |
|---|---|---|---|---|---|
| polyester according to this invention (Table 1, Example 6) | Mn | 60 | 1.06 | 1.01 | +3.9 |
| | Co | 15 | | | |
| | Ge | 135 | | | |
| | Ti | 10 | | | |
| | P | 80 | | | |
| polyester of the prior art (German Offenlegungsschrift 2,707,832, Table 3) | Mn | 84 | 0.98 | 0.83 | +9.4 |
| | Co | 19 | | | |
| | Sb | 73 | | | |
| | Ti | 69 | | | |
| | P | 123 | | | |

*based on the weight of terephthalic acid units
**ASTM D 2244-68

The preceding examples can be repeated with similar

Table 2

| Example | Trans-esterification catalyst | | Polycondensation catalyst | | | | RSV (dl/g) before after hydrolysis test | | Color of the melt |
|---|---|---|---|---|---|---|---|---|---|
| 8 | 17.9 mg Mn(ac)$_2$ | | 59 mg TPP | | 10.3 mg GeO$_2$ | | 1.57 | 1.45 | colorless |
| | 3.6 mg Co(ac)$_2$ | | | | 1 mg TTI | | | | |
| 9 | 15.2 mg Mn(ac)$_2$ | | 42 mg TPP | | 6.3 mg GeO$_2$ | | 0.67 | 0.65 | colorless |
| | 2.9 mg Co(ac)$_2$ | | | | 1 mg TTI | | | | |
| 10 | 12 mg Mn(ac)$_2$ | | 38 mg TPP | | 10.3 mg GeO$_2$ | | 0.65 | 0.63 | colorless |
| | 3.6 mg Co(ac)$_2$ | | | | 2 mg TTI | | | | |
| 11 | 12 mg Mn(ac)$_2$ | | 18.7 mg TTPI* | | 10.3 mg GeO$_2$ | | 0.62 | 0.62 | colorless |
| | 3.6 mg Co(ac)$_2$ | | | | 2 mg TTI | | | | |
| F | 17.9 mg Mn(ac)$_2$ | | 59 mg TPP | | 10.3 mg GeO$_2$ | | 1.31 | 1.03 | colorless |
| | 3.6 mg Co(ac)$_2$ | | | | | | | | |
| G | 14.7 mg Mn(ac)$_2$ | | 73 mg TPP | | 6.3 mg GeO$_2$ | | 1.29 | 1.13 | colorless |
| | 7.2 mg Co(ac)$_2$ | | | | | | | | |
| H | 14.7 mg Mn(ac)$_2$ | | 58 mg TPP | | 6.3 mg GeO$_2$ | | 1.32 | 1.11 | colorless |
| | 6.5 mg Zn(ac)$_2$ | | | | | | | | |
| I | 18.4 mg Mn(ac)$_2$* | | 58 mg TPP | | 6.3 mg GeO$_2$ | | 0.63 | 0.60 | slightly yellowish |
| | 3.2 mg Mg(ac)$_2$ | | | | 2 mg TTI | | | | |
| K | 14.7 mg Mn(ac)$_2$ | | 73 mg TPP | | 6.3 mg GeO$_2$ | | 1.22 | 1.16 | slightly yellowish |
| | 6.4 mg Mg(ac)$_2$ | | | | | | | | |
| L | 18.4 mg Mn(ac)$_2$ | | 49 mg TPP | | 6.3 mg GeO$_2$ | | 1.44 | 1.20 | pale yellow |
| M | 18.4 mg Mn(ac)$_2$ | | 49 mg TPP | | 12.5 mg GeO$_2$ | | 1.31 | 1.15 | pale yellow |
| N | 25.6 mg Mn(ac)$_2$ | | 68.5 mg TPP | | 34.5 mg Sb$_2$O$_3$ | | 1.50 | 1.23 | grayish tinge |
| O | 30 mg Co(ac)$_2$ | | 78 mg TPP | | 10.3 mg GeO$_2$ | | 1.33 | 0.94 | bluish |
| P | 26 mg Zn(ac)$_2$ | | 78 mg TPP | | 10.3 mg GeO$_2$ | | 1.15 | 0.97 | colorless |
| Q | 11 mg Pb(ac)$_2$* | | 19 mg TPP | | 10.3 mg GeO$_2$ | | 1.20 | 1.08 | slightly yellow |
| R | 32 mg Cd(ac)$_2$* | | 78 mg TPP | | 10.3 mg GeO$_2$ | | 1.32 | 1.09 | slightly yellow |
| S | 18.4 mg Mn(ac)$_2$ | | 23.4 mg TTPI | | 10.3 mg GeO$_2$ | | 1.20 | 1.00 | yellowish |
| T | 26 mg Zn(ac)$_2$ | | — | | 10.3 mg GeO$_2$ | | 0.74 | 0.39 | colorless |
| U | 14.7 mg Mn(ac)$_2$ | | — | | 12.5 mg GeO$_2$ | | 0.58 | 0.29 | yellowish |
| V | 14.6 mg TTI | | — | | — | | 0.76 | 0.62 | yellow |
| W | 14.7 mg Mn(ac)$_2$ | | 42 mg TPP | | 6.3 mg GeO$_2$ | | 1.18 | 1.09 | yellowish |
| | | | | | 0.5 mg TTI | | | | |
| X | 14.7 mg Mn(ac)$_2$ | | 40 mg TTPI | | 6.3 mg GeO$_2$ | | 0.57 | 0.49 | grayish-tinged |
| | | | | | 8.7 mg Sb$_2$O$_3$ | | | | |
| Y | 14.7 mg Mn(ac)$_2$ | | 72 mg TPP | | 6.3 mg GeO$_2$ | | 1.26 | 1.08 | pale yellowish |
| | 3.2 mg Mg(ac)$_2$ | | | | | | | | |

*Pb(ac)$_2$: lead-II acetate
Cd(ac)$_2$: cadmium acetate
Mg(ac)$_2$: magnesium acetate
TTPI: triphenyl phosphite

Example 12

The characteristics of a polyester according to Table 1, Example 6 were compared with those of a polyester manufactured according to German Offenlegungsschrift 2,707,832, Table 3.

The results obtained are shown in Table 3 below.

success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing high molecular weight poly-(ethylene terephthalate) in two stages, comprising, in the first stage, reacting a dialkyl ester of terephthalic acid with ethylene glycol in the presence of 35 to 290 ppm of manganese, in the form of a manganese-II salt effective as a catalyst, together with 6 to 95 ppm of cobalt, in the form of a cobalt-II salt effective as a catalyst, at a temperature of 170°–220° C. to give a low molecular weight precondensate; then adding 45 to 140 ppm of phosphorus in the form of a phosphorus compound effective to minimize discoloration of the product poly-(ethylene terephthalate) due to said transesterification catalysts; and, in the second stage, effecting complete condensation of the precondensate thus obtained, in the presence of catalysts at a temperature of 270°–290° C. and under low pressure, to give high molecular weight poly-(ethylene terephthalate), the improvement wherein the second stage, 115 to 230 ppm of germanium, in the form of a germanium-IV salt effective as a catalyst, and 2 to <20 ppm of titanium, in the form of a titanium-IV salt effective as a catalyst, all quantity data for the catalyst components being based on the weight parts of terephthalic acid units, are added to the reaction mixture as the catalysts.

2. The process of claim 1 wherein, after adding the Ge(IV) and Ti(IV) catalyst components, first the temperature of the reaction mixture is raised to 270°–290° C. and then the reaction pressure is lowered continuously to a value below 0.5 mbar, in order to carry out the second stage.

3. The process for preparing high molecular weight poly-(ethylene terephthalate) of claim 1, wherein, in the second stage, 120 to 160 ppm of germanium, in the form of a germanium-IV salt effective as a catalyst, and 5 to 15 ppm of titanium, in the form of a titanium-IV salt effective as a catalyst, in each case based on the weight parts of terephthalic acid units, are employed.

4. The process of claim 1 wherein the ratio of dialkyl ester of terephthalic acid is 1:1.5–3.

5. The process of claim 1 wherein the manganese salt is a salt of a carboxylic acid or hydroxycarboxylic acid of 1–6 carbon atoms or manganese-II oxide, hydroxide, carbonate or ethyleneglycolate.

6. The process of claim 1 wherein the cobalt salt is a salt of a carboxylic or hydroxycarboxylic acid of 1–6 carbon atoms or Co(II) nitrate, chloride, oxide or ethyleneglycolate.

7. The process of claim 1 wherein the phosphorus compound is phosphorus acid, phosphoric acid, or a $C_{1-12}$ alkyl- or $C_{1-12}$ aryl- phosphite or phosphate.

8. The process of claim 1 wherein the germanium salt is Ge(IV) oxide or ethyleneglycolate, or an alkali metal germanate.

9. The process of claim 1 wherein the titanium salt is a Ti(IV) $C_1$–$C_4$ alkoxide, an alkali metal titanate or an alkali metal hexafluorotitanate.

10. The process of claim 1 wherein the molar ratios of the catalyst components are:
Mn:Co=3–6:1
Mn/Co:P=0.5:1
Ge:Ti=10–20:1
Ge/Ti:Mn/Co=1–3:1.

11. The high molecular weight poly-(ethyleneterephthalate) produced by the process of claim 1.

* * * * *